(12) United States Patent
Hooker et al.

(10) Patent No.: US 12,002,306 B2
(45) Date of Patent: Jun. 4, 2024

(54) SYSTEMS AND METHODS FOR ASSESSING AIRCRAFT PERFORMANCE, AIRCRAFT FUEL EFFICIENCIES, AND AIRCRAFT FUEL REDUCTION TECHNOLOGIES

(71) Applicant: Vortex Control Technologies LLC, New York, NY (US)

(72) Inventors: John R. Hooker, Acworth, GA (US); Andrew G. Morgan, Edmonds, WA (US)

(73) Assignee: VORTEX CONTROL TECHNOLOGIES LLC, New York, NY (US)

( * ) Notice: Subject to any disclaimer, the term of this patent is extended or adjusted under 35 U.S.C. 154(b) by 318 days.

(21) Appl. No.: 17/493,481

(22) Filed: Oct. 4, 2021

(65) Prior Publication Data

US 2023/0108129 A1    Apr. 6, 2023

(51) Int. Cl.
G07C 5/08      (2006.01)
G07C 5/00      (2006.01)

(52) U.S. Cl.
CPC .......... G07C 5/0808 (2013.01); G07C 5/004 (2013.01); G07C 5/008 (2013.01); G07C 5/085 (2013.01)

(58) Field of Classification Search
CPC ...... G07C 5/0808; G07C 5/004; G07C 5/008; G07C 5/085
See application file for complete search history.

(56) References Cited

U.S. PATENT DOCUMENTS

| | | |
|---|---|---|
| 357,826 A | 2/1887 | Heney |
| 3,384,326 A | 5/1968 | Neubeck |
| 3,419,232 A | 12/1968 | McStay et al. |
| 3,578,264 A | 5/1971 | Kuethe |
| 4,264,043 A | 4/1981 | Walker |
| 4,455,045 A | 6/1984 | Wheeler |
| 4,718,620 A | 1/1988 | Braden et al. |
| 4,736,913 A | 4/1988 | Bennett et al. |
| 5,069,402 A | 12/1991 | Wortman |

(Continued)

FOREIGN PATENT DOCUMENTS

| | | |
|---|---|---|
| EP | 2685292 A2 | 1/2014 |
| KR | 2019-0115596 A | 10/2019 |

OTHER PUBLICATIONS

Woolf, Reagan K., "Applications of Statistically Defensible Test and Evaluation Methods to Aircraft Performance Flight Testing" AIAA 2012 2723, Jun. 2012. (15 Pages).

(Continued)

*Primary Examiner* — Hussein Elchanti
*Assistant Examiner* — Kenneth M Dunne
(74) *Attorney, Agent, or Firm* — Cowan, Liebowitz & Latman, P.C.; Mark Montague

(57) ABSTRACT

The systems/methods analyze the vast reservoir of data that is collected in-flight during a commercial aircraft's travels over several months. That data is analyzed to identify and remove data points that do not represent stable cruise. This may be achieved in multiple steps to manage the extremely large data sets. The data points, now representing stable cruise, are further analyzed to identify control surfaces that are out-of-tolerance (i.e., mis-rigged). That information is (Continued)

subsequently utilized to re-rig the identified mis-rigged control surfaces which, in turn, results in increased aircraft fuel efficiencies.

48 Claims, 11 Drawing Sheets

(56) References Cited

U.S. PATENT DOCUMENTS

| | | | |
|---|---|---|---|
| 5,108,145 | A | 4/1992 | Harris |
| 5,115,999 | A | 5/1992 | Buchsel et al. |
| 5,289,997 | A | 3/1994 | Harris |
| 6,148,179 | A | 11/2000 | Wright et al. |
| 6,715,717 | B2 | 4/2004 | Dixon et al. |
| 7,614,588 | B2 | 11/2009 | Birkenstock |
| 8,226,038 | B2 | 7/2012 | Smith et al. |
| 8,783,617 | B2 | 7/2014 | Harbeck et al. |
| 9,079,658 | B2 | 7/2015 | Smith et al. |
| 9,340,281 | B2 | 5/2016 | Harrison et al. |
| 9,600,944 | B1 * | 3/2017 | Garel ............... G07C 5/008 |
| 9,637,223 | B1 | 5/2017 | Dicocco et al. |
| 10,001,015 | B2 | 6/2018 | Shelman-Cohen |
| 10,059,435 | B2 | 8/2018 | Draggett et al. |
| 10,352,171 | B2 | 7/2019 | Shelman-Cohen |
| 11,046,413 | B2 | 6/2021 | Hooker |
| 2002/0035416 | A1 * | 3/2002 | De Leon ............ G07C 5/008 701/32.4 |
| 2007/0032921 | A1 * | 2/2007 | Allen ............. G01C 23/005 701/123 |
| 2009/0319102 | A1 * | 12/2009 | Winterhalter ........ G07C 5/085 701/14 |
| 2010/0200698 | A1 | 8/2010 | Kreshchishin |
| 2011/0202208 | A1 * | 8/2011 | Karnik ............. G07C 5/0816 701/4 |
| 2012/0325326 | A1 | 12/2012 | Mei |
| 2018/0268722 | A1 | 9/2018 | Meier et al. |
| 2018/0286253 | A1 * | 10/2018 | Darnell ............. G08G 5/0039 |
| 2018/0314776 | A1 * | 11/2018 | Gallo ............... G07C 5/085 |

OTHER PUBLICATIONS

Olson, Wayne M., Aircraft Performance Flight Testing, USAF AFFTC, Edwards AFB, CA, Sep. 2000. (284 Pages) https://apps.dtic.mil/dtic/tr/fulltext/u2/a383746.

Anon. Environmental Protection, vol. III, CO 2 Certification Requirement, Annex 16 to the Convention on International Civil Aviation, ICAO, Mar. 2017. (28 Pages).

Anon., Getting to Grips with Aircraft Performance Monitoring, Airbus Flight Operations Support & Line Assistance, Blagnac, France, Dec. 2002. (241 Pages) https://www.cockpitseeker.com/wpcontent/uploads/goodies/ac/a320/pdf/data/PerfoMonitoring.

Boeing Aircraft Performance Monitoring (APM) System) Anon. APM User Guide, Version 3.10, The Boeing Company Flight Operations Engineering, Oct. 2013. (487 Pages).

Boeing Aero Magazine,4th Quarter, 2006, Issue 24, Publisher Shannon Frew, (32 pages) https://www.boeing.com/commercial/aeromagazine/articles/qtr_4_06/index.html.

Bo Zou et al.—Evaluating Air Carrier Fuel Efficiency and CO2 Emissions in the U.S. Airline Industry—NEXTOR Final Report—Nov. 2012 (66 Pages).

Christopher A Mouton et al., Fuel Reduction for the Mobility Air Forces, Research Report, Rand Corporation, 2015, (129 pages) ISBN: 978-0-8330-8765-2 https://www.rand.org/pubs/research_reports/RR757.html.

Bo Zou, Airline Fuel Efficiency: Assessment Methodologies and Applications in the U.S. Domestic Airline Industry, May 2016, pp. 317-353 (32 pages) in book Airline Efficiency, DOI: 10.1108/S2212-160920160000005012.

Burzlaff, Marcus, Aircraft Fuel Consumption—Estimation and Visualization, Haw Hamburg: Aircraft Design and Systems Group (AERO), Department of Automotive and Aeronautical Engineering, Dec. 13, 2017 (62 Pages) https://nbn-resolving.org/html/urn:nbn:de:gbv:18302-aero2017-12-13.019.

The above U.S. Pat. No. 14, US Publication Nos. 1 and 4 and the foreign patent documents were all cited in the International Search Report dated Jan. 4, 2023 of PCT/US2022/043450, a copy of which is enclosed.

* cited by examiner

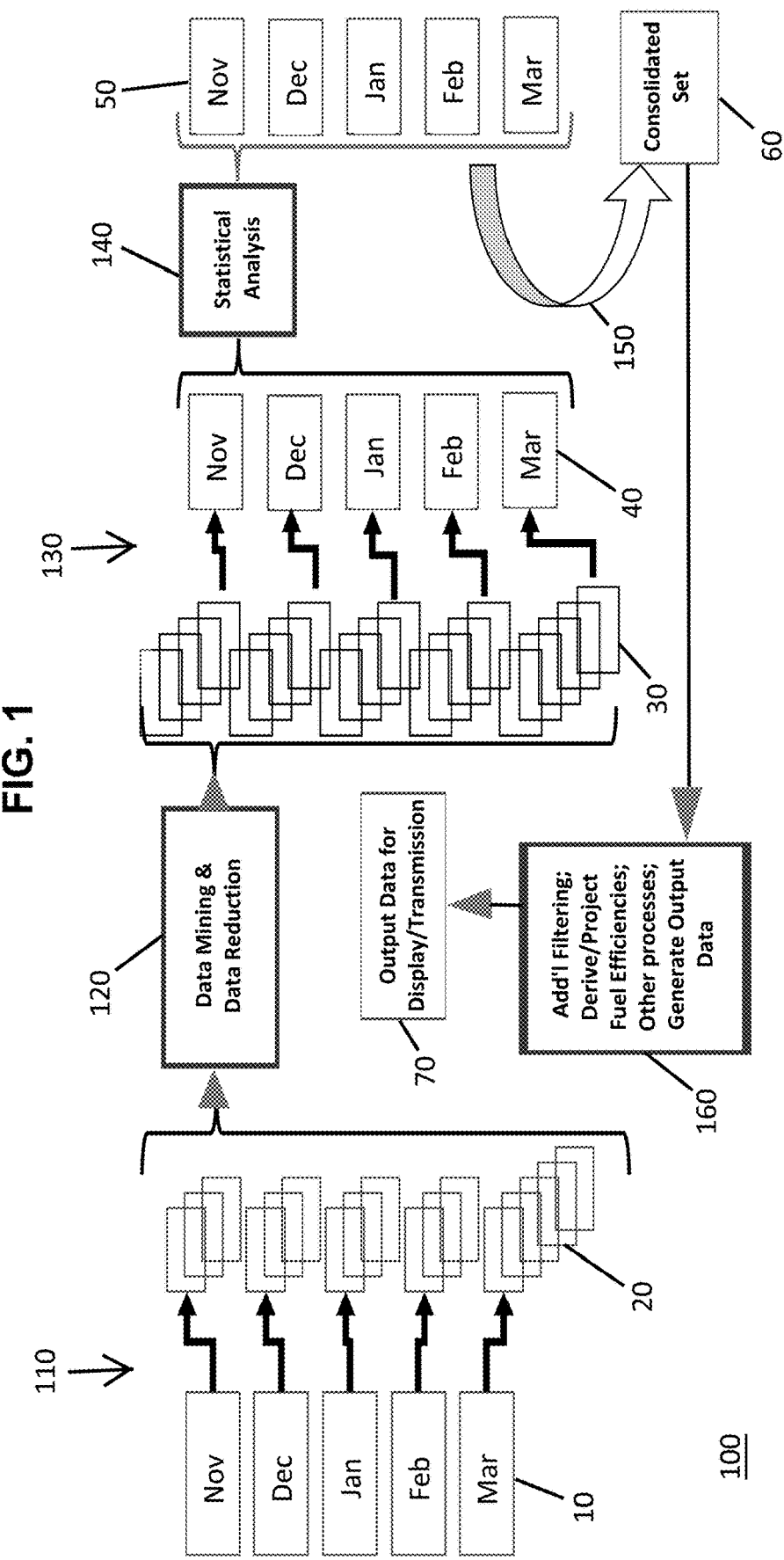

Altitude & Speed

Roll & Drift Angles

Mach Variation

| 30 Aircraft | Deviation Angle (°) | %Fuel Impact |
|---|---|---|
| Left Spoiler | 0.42 | 0.29 |
| Right Spoiler | 0.39 | 0.28 |
| Avg Fleet | 0.41 | 0.57 |

| 30 Aircraft | Deviation Angle (°) | %Fuel Impact |
|---|---|---|
| Avg Fleet | 0.46 | 0.16 |

| 30 Aircraft | Deviation Angle (°) | %Fuel Impact |
|---|---|---|
| Left Aileron | 1.77 | 0.06 |
| Right Aileron | 0.75 | 0.04 |
| Avg Fleet | 1.26 | 0.10 |

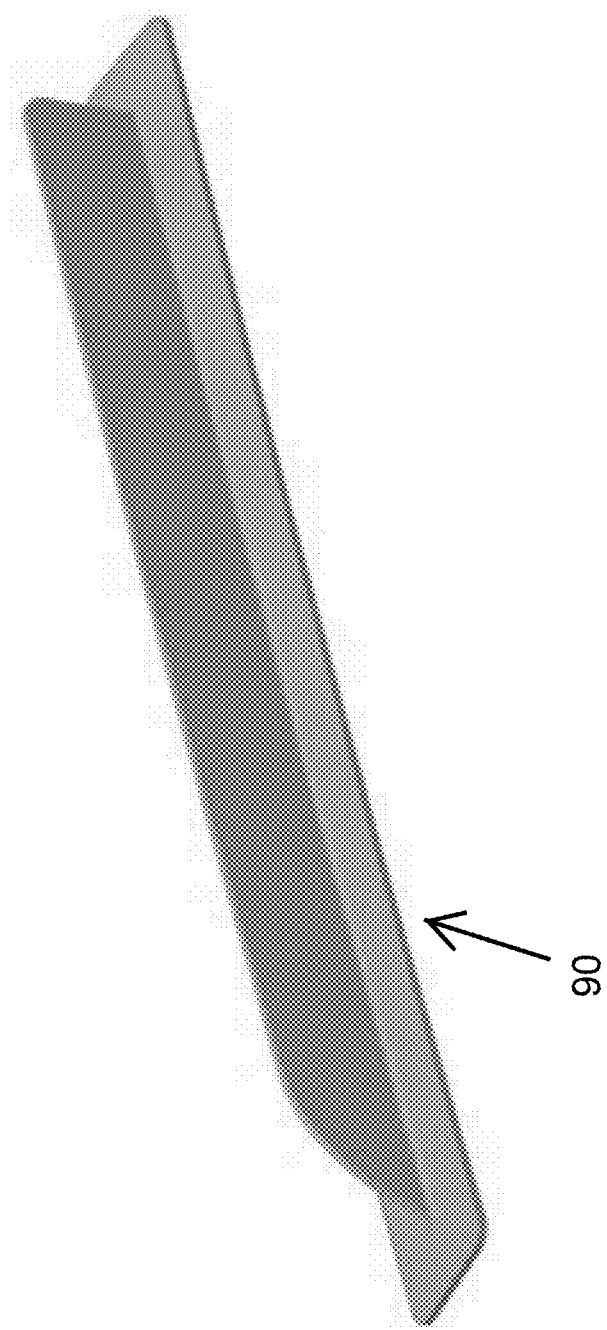

FIG. 7

| | |
|---|---|
| Pressure Alt - ft | 37,300 |
| Gross Weight – lb | 125,650 |
| Mach | 0.780 |
| q-psf [f(Pressure Alt, Mach)] | 190 |
| $S_{ref}$ - sq.ft | 1341 |
| $C_L$ [f(Gross Weight, $S_{ref}$, q)] | 0.493 |
| Predicted $\Delta C_D$ for Finlets | -1.32% |

✺✺✺ = nominal FDAP conditions

For small changes in drag:
% change in drag ≈ % change in SR

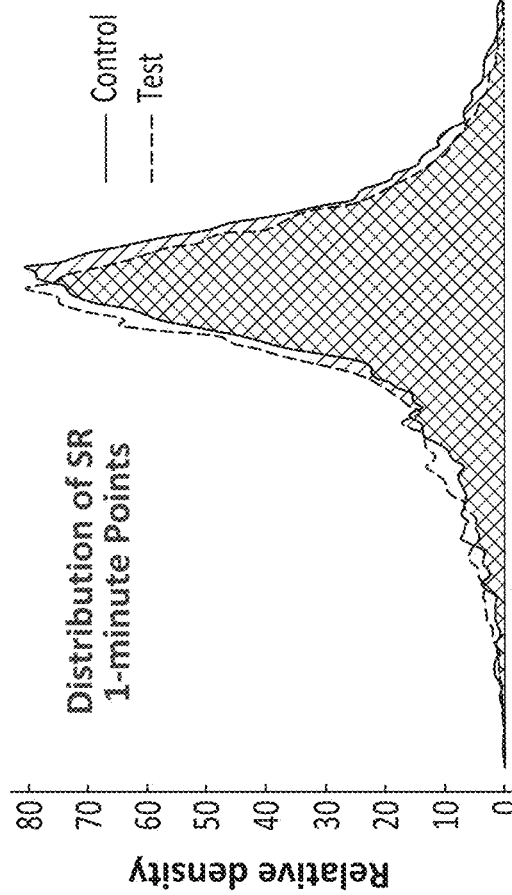

| n (total) | n (control) | Mean SR (nm/lb) (control) | Std Dev SR (nm/lb) (control) | n (test) | Mean SR (nm/lb) (test) | Std Dev SR (nm/lb) (test) | p | Mean %SR | Min %SR (95%) | Max %SR (95%) |
|---|---|---|---|---|---|---|---|---|---|---|
| 46,206 | 30,155 | 0.0918 | 0.00751 | 16,051 | 0.0928 | 0.00735 | <0.001 | 1.14 | 0.99 | 1.29 |

* Initial data mining limited points to: KCAS variation ≤ 2 kt, pressure altitude variation ≤ 50 ft, dVground/dt within ±1 kt/min, mean roll within ±2° and mean drift angle within ± 5°

A confidence level measures the probability that the interval contains the parameter value P-value < 0.05 is strong evidence two sets have different means (i.e., difference in means is not chance)

FIG. 9

| Aircraft Type | Tail Number | Date | Spoilers | | | | | Ailerons | Elevators | | | Rudder | | % Fuel Savings |
|---|---|---|---|---|---|---|---|---|---|---|---|---|---|---|
| | | | LHS | | RHS | | LHS | Δ | %FI | Δ | %FI | Δ | %FI | |
| | | | Δ | %FI | Δ | %FI | Δ | | | | | | | |
| B737-700 | N472WN | 6/18/2021 | 0.42 | 0.29 | 0.39 | 0.28 | 1.77 | 0.02 | 1.13 | 0.06 | 0.42 | 0.04 | 0.46 | 0.16 | 0.93 |
| B737-700 | N747SA | 6/18/2021 | 0.24 | 0.17 | 0.15 | 0.11 | 0.81 | 0.04 | 1.02 | 0.05 | 0.22 | 0.02 | 0.32 | 0.11 | 0.49 |
| B737-700 | N7822A | 6/18/2021 | 0.30 | 0.21 | 0.27 | 0.19 | 0.85 | 0.02 | 1.77 | 0.09 | 0.30 | 0.03 | 0.42 | 0.15 | 0.71 |
| B737-700 | N7826B | 6/18/2021 | 0.23 | 0.16 | 0.57 | 0.41 | 0.70 | 0.05 | 0.98 | 0.05 | 0.23 | 0.02 | 0.41 | 0.14 | 0.90 |
| B737-700 | N7827A | 6/18/2021 | 0.46 | 0.32 | 0.63 | 0.45 | 1.22 | 0.03 | 0.55 | 0.03 | 0.55 | 0.05 | 0.65 | 0.23 | 1.21 |
| B737-700 | N7829B | 6/18/2021 | 0.49 | 0.34 | 0.42 | 0.30 | 0.68 | 0.03 | 1.60 | 0.09 | 0.49 | 0.05 | 0.45 | 0.16 | 1.03 |
| B737-700 | N7831B | 6/18/2021 | 0.47 | 0.32 | 0.35 | 0.25 | 1.53 | 0.03 | 1.22 | 0.07 | 0.47 | 0.04 | 0.30 | 0.10 | 0.88 |
| B737-700 | N7833A | 6/18/2021 | 0.55 | 0.38 | 0.46 | 0.33 | 0.91 | 0.03 | 1.48 | 0.08 | 0.55 | 0.05 | 0.60 | 0.21 | 1.10 |
| B737-700 | N7881A | 6/18/2021 | 0.37 | 0.26 | 0.55 | 0.39 | 1.01 | 0.03 | 1.06 | 0.06 | 0.37 | 0.04 | 0.28 | 0.10 | 0.99 |
| B737-700 | N944WN | 6/18/2021 | 0.32 | 0.22 | 0.50 | 0.36 | 1.00 | 0.06 | 1.22 | 0.07 | 0.32 | 0.03 | 0.35 | 0.12 | 0.91 |
| B737-700 | N735SA | 6/18/2021 | 0.48 | 0.33 | 0.47 | 0.34 | 1.76 | 0.04 | 1.46 | 0.08 | 0.48 | 0.05 | 0.52 | 0.18 | 1.11 |
| B737-700 | N7826B | 6/18/2021 | 0.42 | 0.29 | 0.30 | 0.22 | 1.26 | 0.05 | 1.06 | 0.06 | 0.42 | 0.04 | 0.25 | 0.09 | 0.78 |
| B737-700 | N7827A | 6/18/2021 | 0.20 | 0.14 | 0.26 | 0.19 | 0.67 | 0.02 | 0.59 | 0.03 | 0.20 | 0.02 | 0.33 | 0.11 | 0.61 |
| B737-700 | N472WN | 6/18/2021 | 0.47 | 0.32 | 0.32 | 0.23 | 1.77 | 0.06 | 1.24 | 0.05 | 0.47 | 0.04 | 0.57 | 0.20 | 0.80 |
| B737-700 | N7822A | 6/18/2021 | 0.24 | 0.17 | 0.39 | 0.28 | 1.02 | 0.03 | 0.63 | 0.03 | 0.24 | 0.02 | 0.38 | 0.13 | 0.73 |
| B737-700 | N747SA | 6/18/2021 | 0.50 | 0.35 | 0.58 | 0.42 | 1.69 | 0.06 | 1.17 | 0.06 | 0.50 | 0.05 | 0.56 | 0.19 | 1.00 |
| B737-700 | N7833A | 6/18/2021 | 0.27 | 0.19 | — | — | — | — | — | 0.09 | 0.27 | 0.03 | 0.27 | 0.09 | 0.93 |

| Aircraft Type | Tail Number | Date | % Fuel Savings |
|---|---|---|---|
| B737-700 | N472WN | 6/18/2021 | 1.13 |
| B737-700 | N476WN | 6/18/2021 | 0.60 |
| B737-700 | N735SA | 6/18/2021 | 0.86 |
| B737-700 | N747SA | 6/18/2021 | 1.10 |
| B737-700 | N748SA | 6/18/2021 | 1.42 |
| B737-700 | N7822A | 6/18/2021 | 1.25 |
| B737-700 | N7823A | 6/18/2021 | 1.09 |
| B737-700 | N7826B | 6/18/2021 | 1.29 |
| B737-700 | N7827A | 6/18/2021 | 1.23 |
| B737-700 | N7829B | 6/18/2021 | 1.11 |
| B737-700 | N7831B | 6/18/2021 | 1.36 |
| B737-700 | N7833A | 6/18/2021 | 0.96 |
| B737-700 | N7836B | 6/18/2021 | 0.79 |
| B737-700 | N7843A | 6/18/2021 | 0.93 |
| B737-700 | N7881A | 6/18/2021 | 0.92 |
| B737-700 | N7927A | 6/18/2021 | 1.17 |
| B737-700 | N944WN | 6/18/2021 | 1.17 |

FIG. 11

| Aircraft Type | Tail Number | Date | Spoilers LHS Δ | Spoilers LHS %FI | Spoilers RHS Δ | Spoilers RHS %FI | Ailerons LHS Δ | Ailerons LHS % | Ailerons RHS Δ | Ailerons RHS % | Flaps LHS Δ | Flaps LHS %FI | Flaps RHS Δ | Flaps RHS % | Slats LHS Δ | Slats LHS %FI | Slats RHS Δ | Slats RHS % | Elevators LHS Δ | Elevators LHS %FI | Elevators RHS Δ | Elevators RHS %FI | Rudder Δ | Rudder %FI | % Fuel Savings |
|---|---|---|---|---|---|---|---|---|---|---|---|---|---|---|---|---|---|---|---|---|---|---|---|---|---|
| B737-700 | N472WN | 6/18/2021 | 0.42 | 0.29 | 0.39 | 0.28 | 1.77 | 0.06 | 0.75 | 0.04 | 0.39 | 0.06 | 0.42 | 0.04 | 1.77 | 0.06 | 0.75 | 0.04 | 0.37 | 0.06 | 0.42 | 0.04 | 0.46 | 0.16 | 0.93 |
| B737-700 | N476WN | 6/18/2021 | 0.24 | 0.17 | | | | | | | | | | | | | | 3 | 0.37 | 0.03 | 0.22 | 0.02 | 0.32 | 0.11 | 0.49 |
| B737-700 | N735SA | 6/18/2021 | 0.30 | 0.21 | | | | | | | | | | | | | | 6 | 0.37 | 0.04 | 0.30 | 0.03 | 0.42 | 0.15 | 0.71 |
| B737-700 | N747SA | 6/18/2021 | 0.23 | 0.16 | | | | | | | | | | | | | | 6 | 0.37 | 0.09 | 0.23 | 0.02 | 0.41 | 0.14 | 0.90 |
| B737-700 | N748SA | 6/18/2021 | 0.46 | 0.32 | | | | | | | | | | | | | | 5 | 0.43 | 0.07 | 0.55 | 0.05 | 0.65 | 0.23 | 1.21 |
| B737-700 | N7822A | 6/18/2021 | 0.49 | 0.34 | | | | | | | | | | | | | | 9 | 0.42 | 0.06 | 0.49 | 0.05 | 0.45 | 0.16 | 1.03 |
| B737-700 | N7823A | 6/18/2021 | 0.47 | 0.32 | | | | | | | | | | | | | | 5 | 0.35 | 0.05 | 0.47 | 0.04 | 0.30 | 0.10 | 0.88 |
| B737-700 | N7826B | 6/18/2021 | 0.55 | 0.38 | | | | | | | | | | | | | | 3 | 0.46 | 0.07 | 0.55 | 0.05 | 0.60 | 0.21 | 1.10 |
| B737-700 | N7827A | 6/18/2021 | 0.37 | 0.26 | | | | | | | | | | | | | | 9 | 0.55 | 0.08 | 0.37 | 0.04 | 0.28 | 0.10 | 0.99 |
| B737-700 | N7829B | 6/18/2021 | 0.32 | 0.22 | | | | | | | | | | | | | | 7 | 0.50 | 0.08 | 0.32 | 0.03 | 0.35 | 0.12 | 0.91 |
| B737-700 | N7831B | 6/18/2021 | 0.48 | 0.33 | | | | | | | | | | | | | | 8 | 0.47 | 0.07 | 0.48 | 0.05 | 0.52 | 0.18 | 1.11 |
| B737-700 | N7833A | 6/18/2021 | 0.42 | 0.29 | | | | | | | | | | | | | | 6 | 0.30 | 0.05 | 0.42 | 0.04 | 0.25 | 0.09 | 0.78 |
| B737-700 | N7836B | 6/18/2021 | 0.20 | 0.14 | | | | | | | | | | | | | | 7 | 0.26 | 0.04 | 0.20 | 0.02 | 0.33 | 0.11 | 0.61 |
| B737-700 | N7843A | 6/18/2021 | 0.47 | 0.32 | | | | | | | | | | | | | | 3 | 0.20 | 0.03 | 0.47 | 0.04 | 0.57 | 0.20 | 0.80 |
| B737-700 | N7881A | 6/18/2021 | 0.24 | 0.17 | | | | | | | | | | | | | | 7 | 0.32 | 0.05 | 0.24 | 0.02 | 0.38 | 0.13 | 0.73 |
| B737-700 | N7927A | 6/18/2021 | 0.50 | 0.35 | | | | | | | | | | | | | | 3 | 0.39 | 0.06 | 0.50 | 0.05 | 0.56 | 0.19 | 1.00 |
| B737-700 | N944WN | 6/18/2021 | 0.27 | 0.19 | 0.58 | 0.42 | 1.69 | 0.06 | 1.17 | 0.06 | 0.58 | 0.09 | 0.27 | 0.03 | 1.69 | 0.06 | 1.17 | 0.06 | 0.58 | 0.09 | 0.27 | 0.03 | 0.27 | 0.09 | 0.93 |

Control Surface Fuel Savings — N748SA (Spoilers, Ailerons, Flaps, Slats, Elevators, Rudder)

SYSTEMS AND METHODS FOR ASSESSING AIRCRAFT PERFORMANCE, AIRCRAFT FUEL EFFICIENCIES, AND AIRCRAFT FUEL REDUCTION TECHNOLOGIES

FIELD OF THE INVENTION

The present invention is directed to systems/methods for assessing aircraft performance and is particularly directed to systems/methods for analyzing data collected during commercial flights to assess and quantify fuel efficiencies of modified and unmodified aircraft, assess/identify mis-rigged aircraft control surfaces, validate fuel efficiency performances of finlets and other fuel reduction technologies, among other aircraft fuel efficiency-related features.

BACKGROUND OF THE INVENTION

Fuel represents the second largest cost component in airline operations (after labor). For most commercial flights, over 600 gallons of fuel are expended for each hour of flight. This translates into a cost of at least $20,000 per flight hour. In recent times, fuel costs collectively have exceeded $20,000,000,000 each year (and well exceeded this amount in most recent years). Accordingly, there is clear significant incentive to reduce fuel consumption.

Reducing aerodynamic draft reduces aircraft fuel consumption as well as increases aircraft range and endurance. Certain technologies/components have been developed to reduce drag. As one example, specially-designed finlets manufactured by Vortex Control Technologies, the applicant hereof, attached to the aft portion of the aircraft fuselage reshape airflow to improve pressure distribution and reduce flow separation, thereby reducing profile drag. U.S. Pat. No. 11,046,413, titled Finlets for Aircraft Aft-Body Drag Reduction and which is incorporated herein by reference, describes such finlets.

Other technologies, including winglets, also sometimes (if designed appropriately) reduce fuel consumption by reducing drag. Beyond drag reduction technologies, other manners of fuel savings methods have been employed including modifying flight and flying patterns, use of special materials to reduce weight, improvements in wing design, among others.

Regardless of the fuel reduction technology that is employed, fuel reduction saves significant cost to airlines and other aircraft operators (including the military). For most commercial airlines, 1% fuel reduction translates into a savings of $50,000 per year per aircraft. Reduction in fuel usage also beneficially reduces carbon emission.

Once developed, technology that seeks to reduce fuel consumption, whether by reducing drag or other means, generally must be tested and validated to be accepted within the industry (i.e., by the commercial airlines). Dedicated flight testing is the historical gold standard for establishing aircraft performance. With this approach, a test aircraft is typically specially modified with extremely accurate and calibrated test equipment that accurately monitors aircraft altitude, speed, and orientation (i.e. angle of attack (AoA) and sideslip), and equipped with calibrated fuel flow meters to accurately measure the amount of fuel burned. In some aircraft, the existing onboard systems may be sufficiently accurate to conduct the monitoring.

The flight tests are conducted under very precise and demanding conditions. The flight test effort may take months to complete and is extremely costly. The aircraft is weighed before each flight and may carry ballast to achieve a desired weight and corresponding orientation at cruise conditions. The aircraft is weighed before each flight and detailed logs of fuel burn are taken during the flight so that a rough approximation of aircraft weight at each portion of the flight can be ascertained.

The flight tests occur over the same range at desired times during the day to minimize the effects of any thermals on aircraft performance. Cruise conditions (speed, AoA, sideslip, etc.) are carefully monitored and maintained while the aircraft is on test condition. For a test condition to be considered stable and a good point, exacting criteria must be met (i.e. speed variation<±1 knot/min, altitude variation<50 ft/min, stable aircraft orientation, etc.).

Once these conditions are met, a single data point is taken. This is an exhausting and time intensive process to obtain data across the entire or desired flight envelop. It also typically still has significant variations as the availability of repeat test points is very limited and minor variation on things like external temperature, humidity, or the accuracy of the weight estimates can impact results taken over several days, weeks, or months. This approach is costly, time intensive, and still prone to error. It also leaves the establishment of performance to the OEM (original equipment manufacturer) with no opportunity for the airline or customer to check or confirm it.

The Boeing Company (Boeing) developed a different approach, called the Boeing Airplane Performance Monitoring ("APM") Program, for monitoring and assessing aircraft performance. This approach is based on onboard continuing performance tracking systems that are installed on aircraft. In Boeing's approach, a single data point is recorded during each aircraft flight that is supposed to be representative of stable cruise conditions. This approach/system was developed to identify aircraft that are performing poorly, burning excess fuel, among other things. Boeing's approach has been used to validate fuel efficiency performance improvements of 3 to 5% that are the result of certain fuel saving devices, such as winglets. The APM User Guide "APM Airplane Performance Monitoring Software," Version 3.10, October 2013, published by Boeing, and the Quarterly Publication "AERO" Qtr_04, 2006, published by Boeing and available at the website https://www.boeing.com/commercial/aeromagazine/articles/qtr_4_06/AERO_Q406.pdf, set forth more details about the Boeing APM Program, both of which are incorporated herein by reference.

Such approach, however, is not sufficiently accurate to measure fuel efficiencies that fall meaningfully below 3%. Hence, technologies that may be able to provide smaller fuel efficiencies are not appropriately assessed or validated by Boeing's APM Program. As a result, technologies that result in fuel efficiencies in, for example, the 1% vicinity will not be accepted by commercial airlines as a result of the current inability to validate such fuel savings. This shortcoming is not insignificant. As mentioned earlier, a 1% fuel savings equates to $50,000 per year per aircraft. Accordingly, there is a significant need for improvements in validation systems/processes in this realm.

OBJECTS AND SUMMARY OF THE INVENTION

In view of the foregoing, it is an object of the present invention to provide systems/methods that properly test and validate aircraft fuel reduction technologies that provide smaller fuel efficiencies than can be validated by existing systems and methodologies.

It is a further object of the present invention to provide such systems/methods that can also assess and validate aircraft fuel reduction technologies that provide larger fuel efficiencies.

It is another object of the present invention to provide additional beneficial features to commercial airlines and other aircraft operators including valuable information/feedback regarding fuel efficiencies gained if an aircraft whose data is analyzed is retrofitted or otherwise modified with specific fuel efficiency technology.

It is yet another object of the present invention to provide valuable feedback regarding mis-rigged control surfaces and the fuel efficiencies that could be gained if such mis-rigged control surfaces were corrected.

These and other objects and benefits of the invention are described herein.

To achieve the foregoing, the following are brief summaries of some of the various embodiments of the present invention and various aspects/features thereof.

In accordance with certain embodiments of the present invention, computerized systems (and corresponding methods) for evaluating performance of an aircraft receives flight data regarding flights taken by an aircraft over a period of time. The flight data represents data recorded by one or more onboard flight data recorders during that period of time and the flight data includes data points, each identifying multiple flight parameters as well as aircraft component operation information at respectively different moments in time of flight by the aircraft. The aircraft component operation information includes at least data regarding settings of control surfaces of the aircraft. The system then analyzes the flight data to identify the data points that include at least one flight parameter that represents a non-cruise condition, and filters the flight data to remove the identified data points to produce a reduced-size data set that includes only data points that represent a cruise condition. Filtering can be accomplished in multiple steps. The system then analyzes the reduced-size data to identify the data points that include at least one aircraft component operation information that represents a control surface that is out-of-tolerance and filters the reduced-size data set to remove the data points identified as including at least one aircraft component operation information that represents a control surface that is out-of-tolerance, which in turn produces a second reduced-size data set. The system then analyzes the second reduced-size data set to ascertain a fuel efficiency that would be gained if the control surfaces of the aircraft that are out-of-tolerance are re-rigged to be in-tolerance. Other information may be ascertained, as forth below. The system then supplies as an output data that identifies at least the ascertained fuel efficiency. Other data may be output in different embodiments.

As an aspect of the invention, the received flight data concerns flights taken by the aircraft over a period of at least three months. Other lengths of time may be received.

As another aspect of the invention, each of the data points in the received flight data includes data that identify at least Mach, pressure altitude, total air temperature, ground speed, latitude, drift angle, angle of attack, pitch angle, and roll angle.

As a further aspect of the invention, the received flight data is raw data recorded by the flight data recorders.

As yet a further aspect of the invention, the data points in the received flight data correspond to data stored approximately every four seconds by the flight data recorders during flight by the aircraft over the period of time.

As yet another aspect of the invention, the system generates, from the received flight data, derived parameters and adds the derived parameters for each of the data points to the flight data. The derived parameters include at least estimates of lift and drag, specific range, and engine health quality.

As a further aspect, the system analyzes the flight data to identify the data points with at least one derived parameter that represents a non-cruise condition. Those identified data points are then filtered out.

As another aspect, the system analyzes the flight data to identify and filter out the data points that include a Mach number that is less than 0.40. Other speed filtering thresholds may be employed in other embodiments. For instance, data points that include or indicate a Mach less than 0.5 (e.g., or 0.45, 0.55, 0.60, etc.) may be filtered out. In other versions, data points that indicate a Mach that exceeds a preset amount (e.g., 0.85) may also be filtered out. In yet other embodiments, the threshold is sufficiently lower than the Mach for stable cruise of other aircraft (e.g., for non-commercial aircraft) with yet different cruise speeds.

As yet a further aspect, the system analyzes the flight data to identify and filter out the data points that include a pressure altitude that is less than 12,000 ft. In other embodiments, the pressure altitude employed is different and may be closer than the actual pressure altitude at cruise (e.g., 18,000 ft, 22,000 ft, etc.).

As still yet another aspect, the system analyzes the flight data to identify and filter out the data points that represent a non-cruise condition based on parameters relating to speed, altitude and attitude.

As still yet a further aspect, the system analyzes the flight data to identify and filter out the data points that, over a minute interval, represent a mean acceleration that exceeds ±1 knot/min or altitude variations that exceed ±50 ft/min. Similar to the various additional embodiments mentioned above, these ranges may be modified (e.g., ±1.5 knot/min, ±0.5 knot/min, ±40 ft/min, etc.).

As another aspect, the system analyzes the flight data to identify and filter out the data points that, over a minute interval, represent a mean drift angle that is not in the range of 0±5 degrees or represent a mean roll attitude that is not in the range of 0±2 degrees. Other ranges may be employed.

As a further aspect, the system analyzes the flight data to identify and filter out the data points that, over a minute interval, represent a Mach variation (Maximum Mach–Minimum Mach) that are not less than 0.005. Other thresholds may be employed.

As yet another aspect, the system analyzes the flight data to identify and filter out the data points that, over a minute interval, do not represent a cruise condition. In other embodiments, a different interval of time may be employed (e.g., over 45 seconds, over 1.5 minutes, etc.).

As yet a further aspect, the system analyzes the first reduced-size data to identify and filter out the data points that include aircraft component operation information that indicate that either a left or a right aileron of the aircraft is outside a range of −1 degree to +1 degree. In other embodiments, a tighter (or broader) range may be employed.

As another aspect, the system analyzes the first reduced-size data to identify and filter out the data points that include aircraft component operation information that correspond to a mean spoiler deflection that is outside a range of −0.2° to +0.6°. In other embodiments, different suitable ranges may be employed.

As a further aspect, the system analyzes the first reduced-size data to identify and filter out the data points that include aircraft component operation information that correspond to a rudder deviation that is outside a predetermined acceptable angle.

As another aspect, the system calculates a specific range (SR) of the aircraft based on the data points of the second reduced-size data set, identifies, from the aircraft component operation information of the data points of the first reduced-size data, control surfaces that are out-of-tolerance, and identifies a respective amount of deviation of each of the identified control surfaces. The system then calculates a change in specific range (ASR) of the aircraft relative to a like aircraft without out-of-tolerance control surfaces based on the identified control surfaces that are out-of-tolerance and the identified respective amounts of deviation of the identified control surfaces. The system then supplies as an output the calculated ASR.

As a feature of this aspect, the system obtains published data regarding fuel usage of the like aircraft without out-of-tolerance control surfaces, and calculates the ASR based on the published data and the calculated SR of the aircraft.

As another feature of this aspect, the system conducts computational fluid dynamics simulations to quantify drag reductions caused by the out-of-tolerance control surfaces.

As a further feature of this aspect, the system supplies output data identifying the identified control surfaces that are out-of-tolerance and the identified respective amounts of deviation of the identified control surfaces to enable repair of the control surfaces of the aircraft in accordance with the supplied data.

As a feature of this feature, the identified control surfaces that are out-of-tolerance are re-rigged in accordance with the supplied output data.

As another aspect of the invention, the system ascertains a predicted change in drag as a result of a hypothetical retrofitting of the aircraft with a drag reduction technology, and forecasts a change in specific range (ASR) based on the ascertained predicted change in drag and the second reduced-size data set. ASR represents an improvement in fuel efficiency if the aircraft is retrofitted with the drag reduction technology.

As a feature of this aspect, the drag reduction technology are specially-designed finlets for attachment to the aircraft.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a flow chart of the operation of the present invention;

FIG. 6 shows an exemplary finlet;

FIG. 7 is a table that shows aircraft data if retrofitted with a finlet;

FIGS. 8A and 8B are a graph and a table used to explain fuel saving assessments in accordance with the present invention; and FIGS. 9, 10A, 10B, and 11 are exemplary displays that show data concerning analysis and fuel savings for a fleet of aircraft.

DETAILED DESCRIPTION OF THE PRESENT INVENTION

Figure 2A:
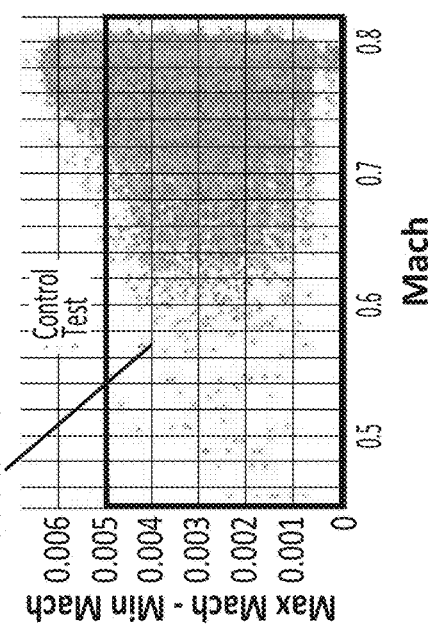
FIGS. 2A-2C are charts used to explain data filtering operations for stable cruise.

As described in detail herein, the systems/methods of the present invention (hereinafter, sometimes for convenience referred to herein as the "invention") take the novel approach of leveraging the vast reservoir of data that is collected in-flight during a commercial aircraft's travels. The invention, by analyzing such data in certain novel manners, assesses, quantifies, and validates fuel usage/efficiency of aircraft that are both modified (i.e., with fuel saving technology) and unmodified (without such fuel saving technology).

The invention assesses and identifies mis-rigged aircraft control surfaces to ascertain fuel usage/efficiency of those aircraft if re-rigged. With such identification, a commercial airline or other entity can subsequently re-rig the identified mis-rigged control surfaces during standard servicing of that aircraft or elect to service that aircraft sooner. The invention assesses and identifies potential fuel efficiencies of an aircraft if modified with certain fuel saving technology. Other features and benefits of the invention are described.

Commercial aircraft are fitted with flight recorders that continuously collect raw data concerning the flight, such as aircraft speed, pressure altitude, etc. Commercial aircraft generally travel between cities regularly, often daily, and the commercial airlines stores the data that have been captured by the aircraft's flight recorder over the many flights that have been travelled by the aircraft. The inventive systems/processes take such data collected over several months of flight for one or more aircraft and conduct an in-depth analysis of that data to obtain stabilized cruise intervals (e.g., one-minute cruise intervals) for each aircraft. The inventive systems/processes remove points with anomalous characteristics, such as off-nominal control surface indications and irregular engine parameters, which introduce bias and scatter in computations. The resulting data sets consist of hundreds of thousands of points. Then, with such data sets, statistically robust performance models are generated for each aircraft under consideration. If the aircraft is unmodified (i.e., without certain fuel saving technology . . . to be further discussed), then performance models are automatically generated by a computer processor that executes specific software instructions of the present invention, calculating and indicating the improvements and fuel efficiency gains for that aircraft if modified with such certain fuel saving technology. Remaining outliers from the model in performance may correspond to points with abnormal characteristics that are not measured in the data stream. As an example, these points might correspond to airplanes with excessive dirt accumulation or missing pressure seals on cabin doors. Removal of these points from the automated fuel efficiency calculations further refines the models of the unmodified and modified aircraft.

The inventive systems/processes ascertain changes in aircraft drag and specific range to within ±0.15% with 95% statistical confidence. The inventive methodologies employ data for an individual aircraft that correspond to thousands of hours of flight that, in turn, results in such a tight confidence interval. As will be appreciated, the present invention provides a more precise and exact fuel efficiency model and results as compared to prior art techniques.

These results and benefits (along with other benefits) open up the potential to validate fuel saving technologies that provide smaller performance benefits that cannot be validated with currently existing validation approaches. As it becomes more difficult to find untapped technologies that provide fuel efficiencies as high as 3%, the need to validate smaller efficiencies becomes more critical. With the present invention's ability to assess and validate technologies that provide smaller fuel savings, and particularly the industry's acceptance and adoption of the inventive methodology, the aerospace, related and even unrelated industries (e.g. industries that develop new, lighter materials) will be motivated to expend resources in this realm.

Abbreviations and Definitions

The following abbreviations and definitions are used herein. Some of these abbreviations and definitions are well known and/or industry terms of art.

The terms/phrases "systems/methods of the present invention," "the present invention," "the invention," "the inventive systems/methods" and the like are used interchangeably herein to refer broadly to one or more embodiments of the invention described herein. It is not intended that such terms/phrases refer to a particular, specific embodiment, unless otherwise stated.

The present invention sometimes is referred to herein as the "Flight Data Analysis Program" or "FDAP."

Mach number or "M" is the ratio of the speed of the object to the speed of sound. In aviation in general, the Mach number is the ratio of the true air speed of the aircraft to local speed of sound, which can vary due to atmospheric conditions, air temperature, density and other factors.

"Specific Range" or "SR" (also sometimes referred to as "Specific Air Range") is the distance an aircraft travels per unit of fuel consumed, typically in terms of nautical miles per pound of fuel (nm/lb).

$\Delta$ASR refers to the change in SR value as a result of fuel savings.

% FMDev is fuel mileage deviation, representing the fuel savings over one or more flights.

"Cruise Mach" refers to data points with a Mach value in the range of approximately 0.77 to 0.80. This cruise range represents stable aircraft cruising.

"Stable Cruise" refers to a flight phase during which the aircraft is travelling at a constant speed, is neither climbing nor descending, and is not turning. Certain exemplary conditions that establish stable cruise are set forth herein. The term "cruise" refers to stable cruise unless stated otherwise.

The terms "Unmodified Aircraft" and "Modified Aircraft" refer, respectively, to an aircraft that does not have particular technology that results in a fuel efficiency and to an aircraft that employs such particular technology that results in the fuel efficiency. As a non-limiting example, an unmodified aircraft does not include finlets (e.g., those described in U.S. Pat. No. 11,046,413 referenced above) and the modified aircraft includes such finlets.

"Flight Data Recorder" refers to an electronic recording device that is onboard an aircraft during flight that automatically records parameters and other information throughout the aircraft's flight.

Referring now to the drawings, FIG. 1 shows a flow chart 100 of the operation of the present invention. In Process Step 110, raw flight data 10 taken over a period of a time (e.g., five months as shown in FIG. 1) for a particular commercial aircraft is received from the airline (or another entity) and stored in a computer memory of one or more computing devices/systems (of the inventive system) that are carrying out the present invention (to be further discussed).

The data received from the airline corresponds to data acquired/stored in the aircraft's flight data recorder (or other data recorder device) that stores a large range of flight parameters and aircraft component operational data, generally every four (4) seconds, over the entire flight. Such parameters/operational data usually include aircraft speed, pressure altitude, angle of attack, sideslip ($\beta$), outside temperature, control surface settings (i.e., rutters, flaps, ailerons, elevators, etc.), engine information, exhaust gas temperature (EGT), etc. The types of parameters/data vary by engine and airframe type. Generally at least the following core set of parameters are received: Mach, pressure altitude, TAT (total air temperature), gross weight, CG ground speed, latitude, drift angle, AoA, pitch angle, and roll angle The data (sometimes referred to herein as "FDAP data") received by the inventive system can be several months of data corresponding to that aircraft's flights over that period of time, or a different length of time. Generally, the input files received from an airline are monthly based (one file per month) and each file can include more than 2.5 GB of raw flight data (or more than 16 million data points). The total amount of data received may be in the terabytes range. The number and size of the received files may be different.

During process 110, the received data 10 are surveyed for size, content and data frequency, and then reorganized into smaller subfiles 20 representing cruise segments containing the raw data. Each of the smaller subfiles 20 may be about 350 Mb in size, as compared to the several gigabytes of data of each of the originally received files. At this point in the process, the data point count can number tens or hundreds of millions.

The data within the subfiles 20 undergo certain data mining and data reduction processes in Process Step 120 in FIG. 1. The inventive system (or FDAP) executes specialized software instructions (stored in a memory) that cause one or more computer processors of a computing device to perform a number of processes and process steps of the invention.

The FDAP computes the means and descriptive statistics for raw parameters over the cruise segments. Derivatives and linear curve fits are determined for altitude and inertial speed versus time. Derived parameters are calculated. This may include atmospheric properties, winds, engine health/data quality, excess thrust, estimates of lift and drag, specific range (SR), and other properties that may be relevant. The derived parameters are added to the data sets under analysis.

The FDAP filters data points with drop-outs, exceed unrealistic peaks, and other atypical or unreliable data points. In actual analyses conducted, approximately 5% of the data points were filtered out during this step.

Certain non-cruise condition points are also filtered out. In particular, data points taken at Mach<0.40, pressure altitude<12,000 ft, and other specific limitations and cut-off values that define the stable cruising conditions that are based on speed and acceleration stability, altitude stability, and attitude stability are removed. Other crude stability criteria may be applied. This leaves only the meaningful (or more reliable) data points. The process reduces data in 1-minute swathes. In other embodiments, different acceptable filtering thresholds may be employed, such as filtering data points with Mach lower (and/or higher) than other amounts. Other acceptable thresholds of other various parameters employed for filtering may be used to filter out data points taken at non-cruise conditions.

Process 120 keeps only the meaningful (or more reliable) data points, and the process reduces the original size of files 20 to a data-reduced set of subfiles 30 that have sizes that are more manageable for further processing. That is, the application of employing crude stability criteria in process 120 to leave only the potentially meaningful points beneficially reduces the data set to a more manageable size.

The data-reduced set of subfiles 30 are merged into a smaller set of files 40 for purposes of ease of management in the subsequent steps. In one embodiment, each of the files 40 corresponds to a respective month of flight data.

Files 40 undergo statistical analysis type processing during process step 140 shown in FIG. 1, wherein the data points are filtered to nominal conditions and fuel usage is compared for different flights.

In particular, during process step 140, precise criteria and limits for maneuver stability are applied to extract data points representative of stable cruise. Small variations in airspeed, altitude, and roll angles produce changes in drag and fuel burn that add scatter and uncertainty that may obscure small changes in airplane drag. Data points not representative of cruise are filtered out.

Once the stable cruise data points are identified, the data points then undergo further analysis (i.e., filtering) that correspond to assessing the aircraft's configuration during cruise. Small deflections in a control surface (often due to variations in rigging) produce (either directly or indirectly) changes in drag that, in turn, impact fuel usage. For a modified aircraft, such as one with finlets, the effect of the finlets are obscured. Control surfaces that impact results when misrigged include the ailerons, flaps, spoiler, slats, elevators, and rudder. Aircraft configuration analysis is further discussed below.

Representative nominal conditions for cruise and aircraft configuration include such factors as: altitude, airspeed, roll angle, drift angle, Mach, exhaust gas temperature, aileron, spoiler, among others.

Applying precise criteria and limits for maneuver stability is further discussed with reference to the charts shown in FIGS. 2A-2C.

In FIG. 2A, altitude and speed criteria are illustrated for stable cruise, wherein data points are kept when the mean acceleration does not exceed±1 knot/min and the altitude variations do not exceed±50 ft/min. In accordance with process 140, only data points that satisfy these altitude and speed limitations over a one-minute interval are selected for further analysis. In other words, data points that do not satisfy both of these requirements are filtered out.

Figure 2B:
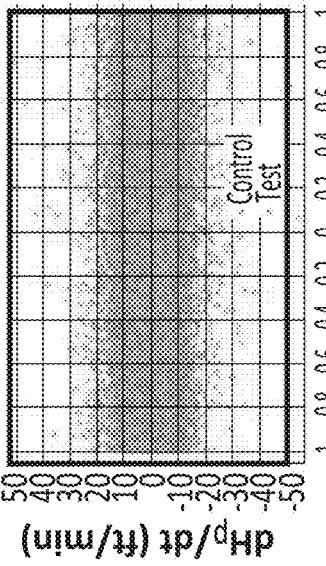

FIG. 2B shows the roll and drift angle of data points. Stable cruise exists with a mean drift angle that is in the range of 0±5 degrees and a mean roll attitude that is in the range of 0±2 degrees. Only data points that satisfy these drift and roll limitations over a one-minute interval are kept.

Figure 2C:
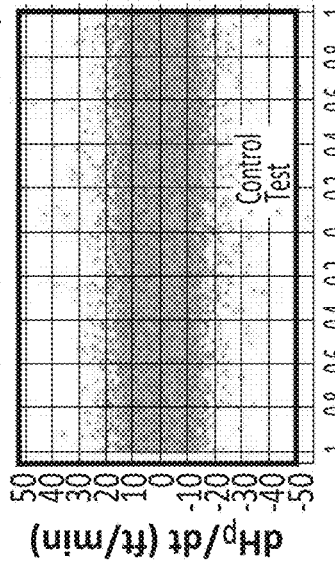

FIG. 2C shows mach variation. Data points are kept when the Mach variation (Maximum Mach−Minimum Mach) is less than 0.005 over one-minute intervals. This criteria serves as an additional refinement to the speed stability criteria. During actual analysis, this assessment reduced the data point count by 11%.

Other cruise criteria are assessed in similar manners. Depending on the particular embodiment of the invention, more or less cruise criteria, or different combinations of cruise criteria, are employed. Derived parameters may be included and, depending on the embodiment, assessed to determine if the data points should be kept or filtered out (i.e., do such derived parameters represent stable cruise or not).

Figure 3B:
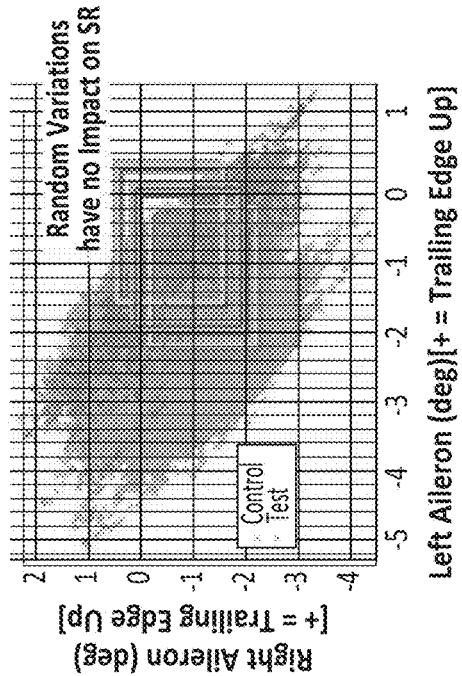
FIGS. 3A-3B are charts used to explain how aileron data are employed.
Figure 3A:
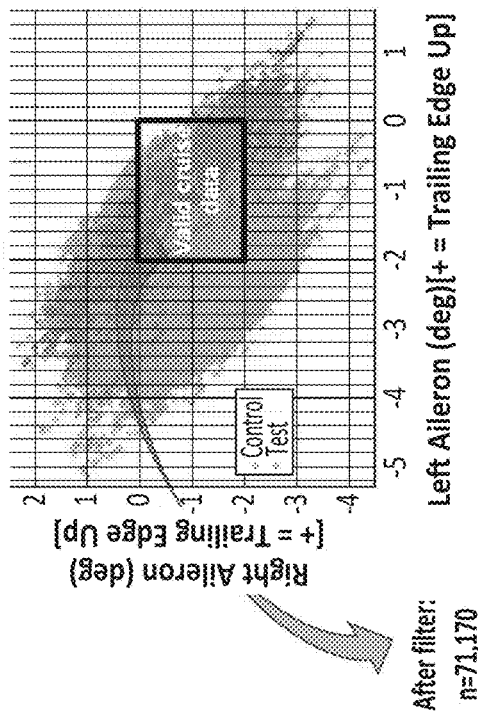

The remaining data points are then analyzed to assess the aircraft's configuration during cruise, as mentioned earlier. One set of control surfaces, the ailerons which control the aircraft's lateral balance, produce about 0.1% drag for 1° deflection during stable cruise in an Airbus A310 aircraft. The drag negatively influences the aircraft's fuel consumption. FIG. 3A shows an exemplary chart where valid cruise data are identified (within the rectangle) for those data points where the left and right ailerons are both within the threshold range of −1° to +1°. Data points outside this range are filtered out. During actual analysis, aileron analysis/filtering reduced the number of data points by 43%.

The −1° to +1° range is selected in accordance with one embodiment of the invention. During evaluation in accordance with the present invention, it was determined that a nominal deflection within the range of −1.5° to −0.6° resulted in relatively negligible drag differences. FIG. 3B is a chart with 20 random variations in nominal deflection of the range −1.5° to −0.6°. The SR results were compared to SR results of the −1° to +1 range threshold. The difference was 0.04% thus establishing that −1° to +1° nominal deflection is suitable.

Figure 4:
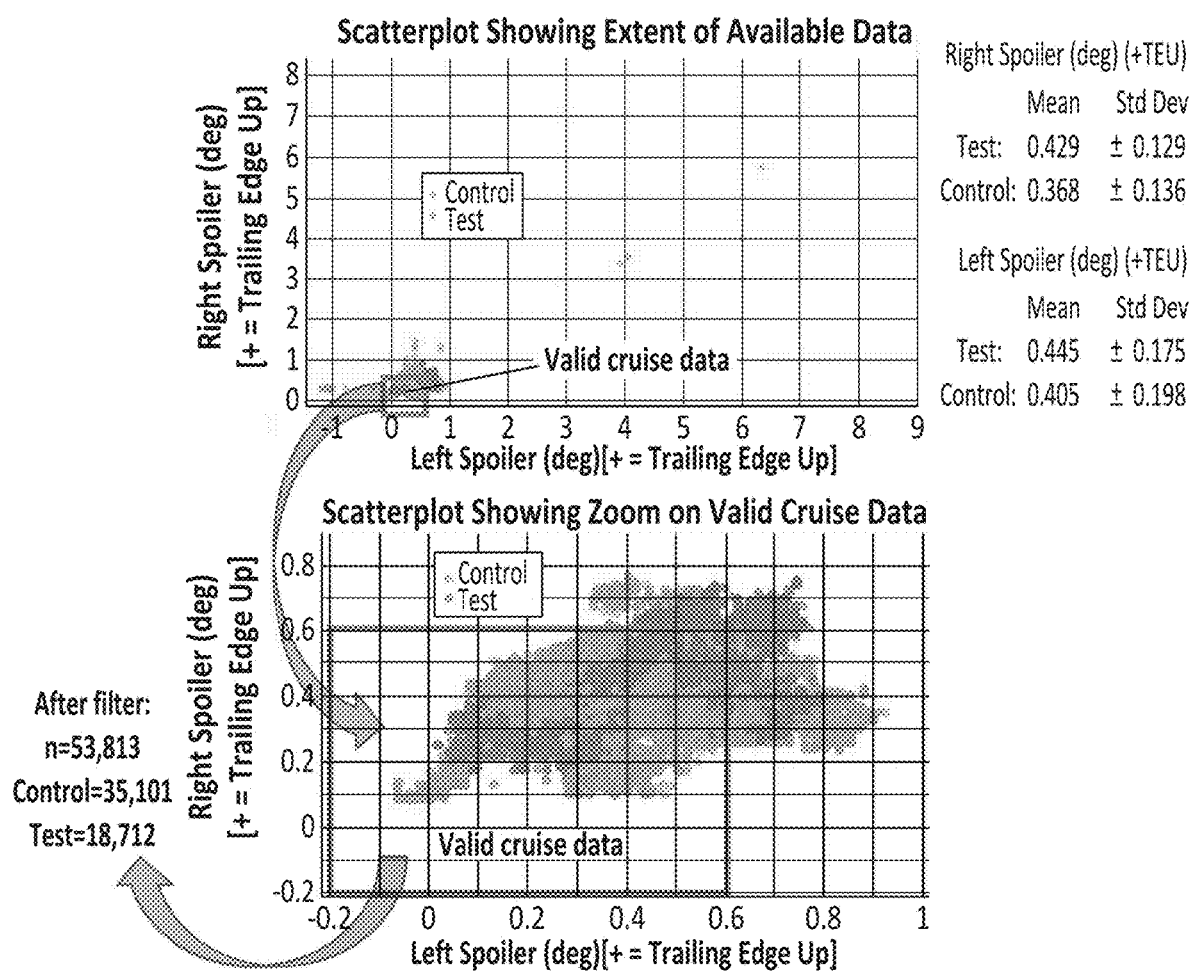
FIG. 4 is a chart used to explain how spoiler data are employed.

For spoilers, which are used to slow or descend an aircraft, a 0.6 degree deflection yields an increase in drag by 0.1% in the Airbus 310. In accordance with the invention, the mean spoiler deflection is restricted to the range of −0.2° to +0.6°. FIG. 4 shows valid cruise data points corresponding to left and right spoiler deflections within that designated range. During aircraft data analysis, spoiler filtering reduced data point count an additional 9%.

The remaining cruise data points undergo analysis for the other control surfaces in similar manners.

Figure 5C:
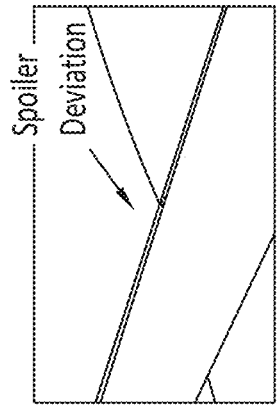
FIGS. 5A, 5B and 5C show an aileron, a rudder, and a spoiler, respectively, along with exemplary deviation data.
Figure 5B:
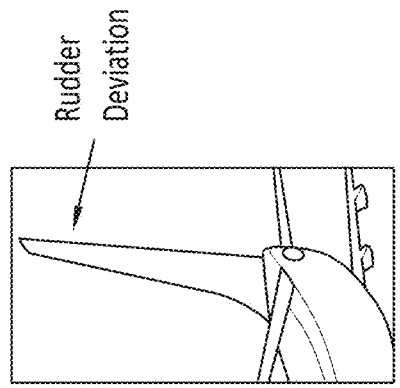
Figure 5A:
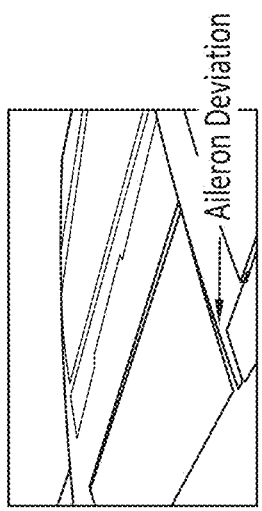

FIGS. 5A, 5B and 5C respectively show an aileron, a rudder, and a spoiler, along with deviation and fuel impact data derived during testing of actual flight data of thirty (30) B737 aircraft. The figures show a 0.10% fuel impact on average (over the entire 30 aircraft) due to aileron deviation, a 0.16% fuel impact due to rudder deviation, and a 0.57% fuel impact due to spoiler deviation. Collectively, amongst the entire fleet of aircraft analyzed, fuel costs over an extended period of time is significant. As illustrated below, the present invention can particularly identify select aircraft with fuel efficiencies seriously reduced due to mis-rigged control surfaces. Commercial airlines (or other entities) beneficially can re-rig the entire fleet or specific aircraft depending on the results provided in accordance with the present invention.

Referring back to FIG. 1, the statistical analysis process step 140 produces sets of data 50 (each set corresponding to a different month of flight). As described, the sets of data 50 are smaller than the prior sets of data 40 due to the filtering out of non-cruise data points and filtering out of data points where control surface deviations are outside of acceptable ranges.

While reduced in size, data sets 50 still represent a significant amount data points, numbering in the hundreds of thousands of points that have passed maneuver stability, aircraft configuration and other applied criteria/limits. Data sets 50 correspond to thousands of hours of stabilized cruise.

Data sets 50 are merged into a single data set 60 in process step 150 for subsequent, consolidated analysis in process steps 160. At this point, a number of different sub-processes can be carried out.

Additional "tightening" of the data points may be achieved by performing additional filtering using tightened criteria for cruise and/or aircraft configuration. Accordingly, some or all of the aforementioned filtering may be carried using different criteria, thresholds or other requirements. Other parameters, not previously analyzed, may be assessed at this point to further filter data points.

By employing knowing statistical analysis methodologies, actual fuel usage during cruise may be ascertained for the aircraft being analyzed.

In the case of when data sets are obtained for a multiple number of aircraft (e.g., within a fleet), averages over the entire fleet (or over the aircraft assessed) may be obtained. Data pertaining to one or more select aircraft may be filtered out (e.g., to remove performance outliers).

At this stage, the inventive system evaluates and applies statistical methods to determine the resulting effect on the SR. This may include computation of mean values, confidence intervals, and hypothesis testing. Finally, based on the results, the system can determine and provide predictions and projections for fuel consumption and fuel use. Actual testing/use of the system demonstrated to measure SR to within ±0.15% with 95% statistical confidence. In accordance with the invention, this tight confidence interval is due to the large number of data points used, corresponding to thousands of hours of flight. Traditional flight testing, which typically involves a relatively few cruise points, does not yield a statistically valuable results.

Quantifying fuel savings associated with re-rigging the out of tolerance control surfaces can be achieved. Two methodologies may be employed. In a first methodology, comparisons between the actual data and published data (e.g., published by the aircraft manufacturer) that designates fuel usage of the properly rigged aircraft and other relevant data.

In a second approach, the present invention conducts detailed computational fluid dynamics (CFD) simulations to quantify the drag increase from mis-rigged control surfaces. With this approach, CFD based simulations are performed using the measured out of tolerance control surface deflections and detailed performance comparisons are made with simulations performed using correctly rigged control surfaces. These simulations are performed by first developing CAD based definitions of the measured control surface deflections and generating high resolution CFD meshes to accurately resolve the deflected control surfaces and their corresponding impact on the aircraft performance characteristics. Then, the CFD simulations are performed on both configurations with the mis-rigged and correctly rigged control surfaces. These require evaluations on both configurations at several angles of attack and/or sideslip to effectively trim the aircraft to the correctly rigged configuration's lift, pitching, and yawing moment coefficients. Once the trim and lift effects of the mis-rigged control surfaces on trimmed drag have been correctly accounted for, the actual drag increment for the mis-rigged control surfaces are quantified. With the drag increment quantified, the impact on aircraft specific range (SR) is then calculated and the fuel savings for re-rigging the control surfaces established.

Given fuel usage assessments and predictions, and potentially published data pertaining to the aircraft's performance, the present invention calculates fuel savings under a number of circumstances.

The present invention, in certain embodiments, predicts the % change in fuel usage if an aircraft is retrofitted with finlets, such as the finlets described in the aforementioned U.S. Pat. No. 11,046,413. FIG. 6 shows an exemplary finlet 90.

FIG. 7 is a table that shows the predicted impact if the exemplary aircraft is retrofitted with finlets. In accordance with the invention, the nominal cruise conditions (as explained herein) and the predicted change in drag as a result of the finlets are combined to forecast the change in SR. As shown in FIG. 7, Pressure Alt, Gross Weight and Mach values reflect the nominal FDAP conditions that are used and applied by the FDAP. In the analysis, for a small change in drag, the % change in the drag value is approximately equal to the % change in the calculated SR value. As shown, the FDAP predicts about 1.3% reduction in drag as a result of finlets.

FIGS. 8A and 8B illustrate fuel saving assessment results according to the present invention (using 1-minute intervals). The mean ASR is 1.14% for use of finlets. As illustrated in the table of FIG. 8B, the results were based on n=46,206 data points, with n=30,155 of control data points. The mean SR (nm/lb) for the control points was 0.0918, while the standard deviation SR (nm/lb) for the control points was 0.00751. The mean SR (nm/lb) for the test data set was 0.0928, and the standard deviation SR (nm/lb) for the test data set was 0.00735. As reflected in the resulting table, the P-value 1197 was calculated to be <0.001, the minimum ASR was calculated to be 0.99, and the maximum ASR was calculated to be 1.29, indicating an approximate 1.14% improvement (with 95% confidence).

The invention is not limited to predictive use of finlets. Other types of drag reduction technologies may be employed.

As mentioned herein, the present system encompasses one or more computing devices with processor(s) and memory (directly or indirectly interconnected) that individually or collectively execute specific computer software that causes the herein-described processes to be carried out, including any of the filtering, analysis or other functional operations described herein. Results of one or more aircraft analyses, and any and all of the data, results and/or other information (data 70 in FIG. 1) may be displayed on a computer monitor, or other appropriate display, and/or may be transmitted via any type of network to other computing devices for further use thereof.

For example, FIGS. 9, 10A, 10B, 11, 12A, and 12B show exemplary displays representative of data that the present invention can produce and visually provide.

FIG. 9 shows an exemplary display representing deviations of various control surfaces for a fleet of aircraft whose flight data have been analyzed in accordance with the invention. FIG. 9 shows control surface mis-rig data and corresponding potential fuel savings from correcting the mis-rig. The data represents actual analysis results performed on a fleet of B737 aircraft.

Figures 10A, 10B:
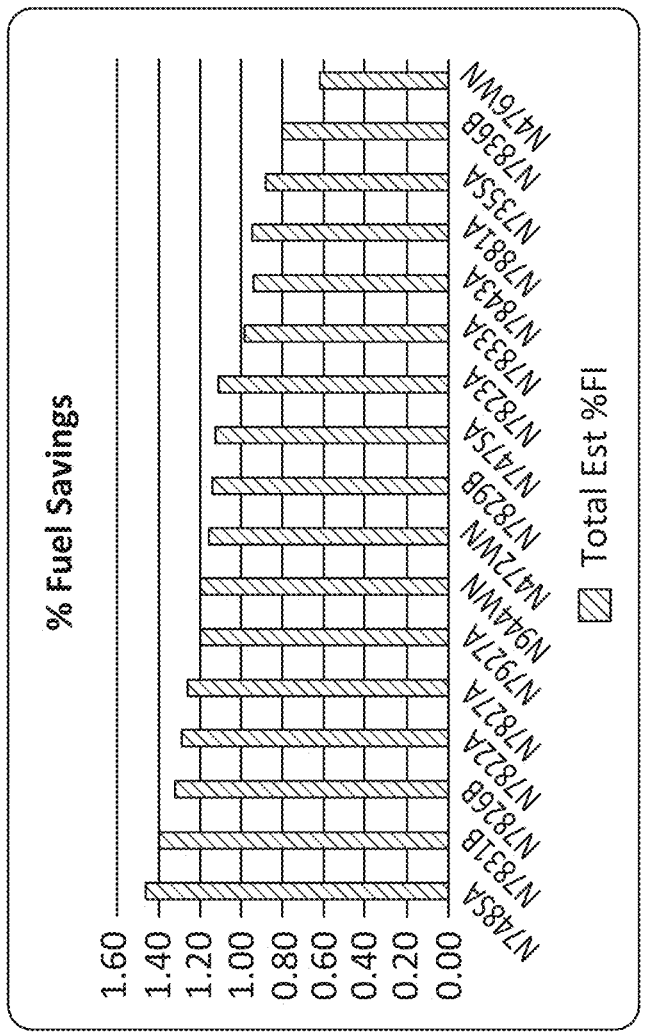

FIGS. 10A and 10B are tables that show results of % fuel saving assessments on the fleet. FIG. 10B is a pareto table that emphasizes those aircraft that will produce the largest fuel savings with re-rigged control surfaces.

FIG. 11 shows an exemplary display of the present invention that identifies control surface data for the fleet along with control surfaces fuel saving assessment data, if re-rigged, for a selected aircraft. In any of the displays and/or outputs, actual fuel usage data and/or fuel efficiency data, fuel inefficiency data or any combination thereof (with respect to the aircraft and/or a control surface, as the case may be and appropriate) may be provided.

As illustrated from the foregoing, the present invention provides various benefits, including in particular the identification of control surfaces of aircraft that are mis-rigged and the extent of such mis-rigging. Airlines or other entities subsequently can select which, if any, of its aircraft to service based on the data. Re-rigging may be carried out solely on the aircraft with the highest % of fuel savings if re-rigged, or its entire fleet, or a select number of aircraft based on the results of the present invention.

As discussed, the present invention also is able to analyze and validate fuel saving technologies that provide performance benefits too small to be validated by currently existing validation approaches. The present invention is able to validate technologies that provide fuel efficiencies as low as 0.15%. This, in turn, may open the market for technologies that provide fuel efficiencies in the 1% range, and even lower (or higher).

The present invention also identifies mis-rigged control surfaces for fixing and identifies the fuel inefficiencies that result from such mis-rigged control surfaces. The present invention may be employed to validate the true performance of an aircraft, which is typically established by the OEM. Other functions and benefits have been described.

The present invention may be employed to establish the actual performance of an aircraft separate and apart from the identification of mis-rigged control surfaces and/or comparisons with aircraft retrofitted with other fuel saving technology. Beyond identifying actual performance, the present invention identifies aircraft that perform poorly for any number of reasons, such as in the case of missing seals, low-performing engines, physical damage to the aircraft, or the multiple other reasons that result in increased drag or otherwise result in reduced fuel efficiency.

Accordingly, the data provided by the present invention enable commercial airlines (and other entities) to readily identify poor performing aircraft and to take remedial action depending on the results provided by the invention.

In some embodiments, projected fuel efficiencies (however they are achieved . . . e.g., by re-rigging control surfaces or modifying an aircraft with certain technology, or other repair/modification) are confirmed by repeating the inventive steps carried out by the present invention based on subsequent flight data after the aircraft is repaired or otherwise modified. Reevaluation may be achieved over different periods of time for individual aircraft and/or for groups of aircraft or the entire fleet.

In some embodiments, the analysis of data points may be performed by a computer that is on-board an aircraft that itself is collecting data regarding the aircraft's flight(s) and/or that is in communication with other systems onboard the aircraft (e.g., a separate data flight recorder).

In some embodiments, aircraft to aircraft analysis is conducted. In some embodiments, data comparison of a specific aircraft over different periods of time may be assessed to uncover and assess trends that occur over time.

As indicated herein, the specific numbers and ranges are illustrative, and certain modifications may be made within the spirit and scope of the invention. For instance, during the various filtering steps, the ranges and/or thresholds used to filter data points based on the value(s) of certain parameters may be modified to result in a "tightening" of the data, that is, less data points that represent a greater accuracy (i.e., data points that truly reflect stable cruise).

In accordance with certain embodiments of the invention, stable cruise entails parameters that are different than those of standard commercial aircraft. For instance, select military aircraft have a stable cruise that is distinctly different from standard commercial aircraft. In such case, the thresholds and ranges mentioned above in connection with standard commercial aircraft may not be applicable. Accordingly, the term stable cruise has parameters and attributes that are specific to the particular type of aircraft under consideration. The thresholds and ranges employed to filter data points out (i.e., that do not represent stable cruise) will be different than some of the exemplary embodiments discussed herein. Accordingly, the present invention is applicable to nearly all type of aircraft, whether a commercial aircraft, a military aircraft or other non-commercial aircraft.

The present invention implements and utilizes certain statistical methods and implements a number of limitation factors in selecting and filtering the processed data that rule out and eliminate, or significantly reduce, the effects of the chance situations or atypical events' effects and influence on fuel savings. Moreover, when comparing the automated results, the present invention not only eliminates the unusual, atypical or chance factors, but also provides for an automated way to compare the "like conditions" of different actual flights.

The embodiments and illustrative descriptions of the present invention are intended to enable a person skilled in the art to make and/or use the disclosed invention. They are not intended to be either exclusive, exhaustive or limiting on the scope of the invention described and claimed herein.

The present invention employs various mathematical models, subprocesses and other general functionality that are well known by persons of ordinary skill in the art. For example, the present invention derives certain parameters from the raw data recorded by an aircraft's flight recorder, such as atmospheric properties, winds, engine health/data quality, excess thrust, estimates of lift and drag, specific range (SR), and so on. Implementing these and other mentioned functionalities is within the knowledge and ability of those of ordinary skill in the art. To not obscure the description herein, detailed descriptions of such known models, subprocesses, functionalities and other general functionality are not provided.

Certain publications may be relevant for their disclosures or teachings therein. Such publications, which are incorporated herein by reference, include: (1) Woolf, Reagan K., "Applications of Statistically Defensible Test and Evaluation Methods to Aircraft Performance Flight Testing," AIAA 2012 2723, June 2012; (2) Hayter, Anthony J., Probability and Statistics for Engineers and Scientists, PWS, Boston, MA, 1996; (3) Rumsey, Deborah J., Statistics for Dummies, 2nd Edition, June 2016; (4) Rumsey, Deborah J., Creating a Confidence Interval for the Difference of Two Means with Known Standard Deviations, copyright 2021, article available at https://www.dummies.com/education/math/statistics/creating a confidence interval for the difference of two means with known standard deviations/; (5) Olson, Wayne M., Aircraft Performance Flight Testing. USAF AFFTC, Edwards AFB, CA, September 2000, available at https://apps.dtic.mil/dtic/tr/fulltext/u2/a383746.pdf; (6) Anon., Getting to Grips with Aircraft Performance Monitoring, Airbus Flight Operations Support & Line Assistance, Blagnac, France, December 2002, available at https://www.cockpitseeker.com/wpcontent/uploads/goodies/ac/a320/pdf/data/PerfoMonitoring.p df; (7) Anon.APM User Guide, Version 3.10, The Boeing Company Flight Operations Engineering, October 2013; (8) Anon. Environmental Protection, Volume III, CO 2 Certification Requirement, Annex 16 to the Convention on International Civil Aviation, ICAO, March 2017.

Other variations or modification could be used and applied by a person skilled in the art without deviating from the scope and spirit of the present invention. Such modifications and alternative arrangements are not intended to be outside the scope of the present invention and are intended to be covered by it. The invention title and abstract are not intended to limit the claimed invention or cover multiple embodiments and all various features of the claimed invention.

Having described the present invention and its numerous features and benefits, it should be appreciated that the present invention includes any and all possible combinations of the disclosed subject matter. Thus, even if a particular embodiment is not discussed as including a feature in a different embodiment, the present invention embodies such feature in any suitable embodiment, and accordingly such particular embodiment optionally includes said particular features of said different embodiment.

Various steps or substeps may be omitted, and various additional steps and sub steps may be added.

Unless otherwise stated, the singular includes the plural in further variations and the plural includes the singular in other further variations of any particular described embodiment, feature, element, step or other thing mentioned herein.

Unless otherwise stated, communication between two devices includes direct communication and indirect communication.

Discussions pertaining to a computer, processor, computing device, and the like shall include a combination of multiple devices. Language relating to a computer, computing device, electronic device, and the like includes any suitable combination of computing devices, including servers, systems, databases, controllers, engines, interfaces, or other types of devices generally recognized to be used within or associated with computing devices.

Computer, computing devices and electronic devices employ a processor configured to execute software instructions that is stored on a tangible, non-transitory computer readable storage medium. Computers, computing devices and electronic devices, along with their associated processors and the tangible, non-transitory computer readable storage mediums are well known in the art.

The present invention also has been described in various instances as carrying out certain processes or steps. Such processes or steps are carried out by appropriate computers, computing devices, electronic devices, processors or other known components capable of carrying out those processes or steps. Hence, even if structural devices are not always mentioned within each of the various sections presented herein, the foregoing mentioned structural devices, such as a processor, computer, computing system, electronic device, etc., represent the structures that may be used in the present invention.

Moreover, the present invention has described a multitude of processes in terms of functions, steps, objectives, and other things, and given the discussion herein, and in light of the discussion herein, a person of ordinary skill in the art to which the present invention applies is able to generate the corresponding code, software applications and/or "apps" as is appropriate and would be understood in the art.

Custom apps may be developed to facilitate these functions wherein a viewer is simply able to push a virtual button on his/her smart phone (or other device) and then the app does the rest, with the assistance of remote servers/systems as already discussed herein.

Having described the present invention including various features and variations thereof, it is intended that the appended claims be interpreted as including the embodiments described herein, the alternatives mentioned above, and all equivalents thereto.

What is claimed is:

1. A computerized method of evaluating performance of an aircraft, comprising the steps of:
    receiving flight data regarding flights taken by an aircraft over a period of time, the flight data representing data recorded by one or more onboard flight data recorders during said period of time, the flight data including a plurality of data points, each of said data points identifying a plurality of flight parameters and aircraft component operation information at respectively different moments in time of flight by the aircraft, the aircraft component operation information including data regarding settings of control surfaces of the aircraft;
    analyzing the flight data to identify the data points that include at least one flight parameter that represents a non-cruise condition;
    filtering the flight data to remove the identified data points to produce a first reduced-size data set that includes only data points that represent a stable cruise condition;
    analyzing the first reduced-size data to identify the data points that include at least one aircraft component operation information that represents a control surface that is out-of-tolerance;
    filtering the first reduced-size data set to remove the data points identified as including at least one aircraft component operation information that represents a control surface that is out-of-tolerance to produce a second reduced-size data set;
    analyzing the first and second reduced-size data sets to ascertain a fuel efficiency that would be gained if the control surfaces of the aircraft that are out-of-tolerance are re-rigged to be in-tolerance;
    supplying as an output data identifying at least the ascertained fuel efficiency; and
    identifying one or more of said control surfaces of the aircraft for rerigging.

2. The method of claim 1, wherein the receiving flight data step comprises receiving flight data regarding flights taken by the aircraft over a period of at least three months.

3. The method of claim 1, wherein each of the data points in the received flight data includes data identifying at least Mach, pressure altitude, total air temperature, ground speed, latitude, drift angle, angle of attack, pitch angle, and roll angle.

4. The method of claim 1, wherein the received flight data is raw data recorded by said one or more flight data recorders disposed onboard the aircraft during said period of time.

5. The method of claim 1, wherein the plurality of data points in the received flight data correspond to data stored approximately every four seconds by the one or more flight data recorders during flight by the aircraft over said period of time.

6. The method of claim 1, further comprising generating from the received flight data derived parameters and adding the derived parameters for each of the data points to the flight data, the derived parameters including at least estimates of lift and drag, specific range, and engine health quality.

7. The method of claim 6, further comprising analyzing the flight data to identify the data points with at least one derived parameter that represents a non-cruise condition.

8. The method of claim 1, wherein the step of analyzing the flight data comprises analyzing the flight data to identify the data points that include a Mach number that is less than 0.40.

9. The method of claim 1, wherein the step of analyzing the flight data comprises analyzing the flight data to identify the data points that include a pressure altitude that is less than 12,000 ft.

10. The method of claim 1, wherein the step of analyzing the flight data comprises analyzing the flight data to identify the data points that represent a non-cruise condition based on parameters relating to speed, altitude and attitude.

11. The method of claim 1, wherein the step of analyzing the flight data comprises analyzing the flight data to identify the data points that, over a minute interval, represent a mean acceleration that exceeds ±1 knot/min or represent altitude variations that exceed ±50 ft/min.

12. The method of claim 1, wherein the step of analyzing the flight data comprises analyzing the flight data to identify the data points that, over a minute interval, represent a mean drift angle that is not in the range of 0±5 degrees or represent a mean roll attitude that is not in the range of 0±2 degrees.

13. The method of claim 1, wherein the step of analyzing the flight data comprises analyzing the flight data to identify the data points that, over a minute interval, represent a Mach variation (Maximum Mach−Minimum Mach) that are not less than 0.005.

14. The method of claim 1, wherein the step of analyzing the flight data comprises analyzing the flight data to identify the data points that, over a minute interval, do not represent a stable cruise condition.

15. The method of claim 1, wherein the step of analyzing the first reduced-size data comprises analyzing the first reduced-size data to identify the data points that include aircraft component operation information that indicate that either a left or a right aileron of the aircraft is outside a range of −1 degree to +1 degree.

16. The method of claim 1, wherein the step of analyzing the first reduced-size data comprises analyzing the first reduced-size data to identify the data points that include aircraft component operation information that correspond to a mean spoiler deflection that is outside a range of −0.2° to +0.6°.

17. The method of claim 1, wherein the step of analyzing the first reduced-size data comprises analyzing the first reduced-size data to identify the data points that include aircraft component operation information that correspond to a rudder deviation that is outside a predetermined acceptable angle.

18. The method of claim 1, comprising:
calculating a specific range (SR) of the aircraft based on the data points of the second reduced-size data set;
identifying, from the aircraft component operation information of the data points of the first reduced-size data, control surfaces that are out-of-tolerance and identifying a respective amount of deviation of each of the identified control surfaces;
calculating a change in specific range (ASR) of the aircraft relative to a like aircraft without out-of-tolerance control surfaces based on the identified control surfaces that are out-of-tolerance and the identified respective amounts of deviation of the identified control surfaces;
supplying as an output the calculated ASR.

19. The method of claim 18, wherein the step of calculating a change in specific range (ASR) comprises obtaining published data regarding fuel usage of the like aircraft without out-of-tolerance control surfaces; and calculating the ASR based on the published data and the calculated SR of the aircraft.

20. The method of claim 18, wherein the step of calculating a change in specific range (ASR) comprises conducting computational fluid dynamics simulations to quantify drag reductions that may be realized by re-rigging or fixing of the out-of-tolerance control surfaces.

21. The method of claim 18, comprising supplying output data identifying the identified control surfaces that are out-of-tolerance and the identified respective amounts of deviation of the identified control surfaces to enable repair of the control surfaces of the aircraft in accordance with the supplied data.

22. The method of claim 21, comprising re-rigging the identified control surfaces that are out-of-tolerance in accordance with the supplied output data.

23. The method of claim 1, comprising:
ascertaining a predicted change in drag as a result of a hypothetical retrofitting of the aircraft with a control surface based drag reduction technology;
forecasting a change in specific range (ASR) based on the ascertained predicted change in drag and the second reduced-size data set, the ASR representing an improvement in fuel efficiency if the aircraft is retrofitted with the drag reduction technology.

24. The method of claim 23, wherein the drag reduction technology comprises a plurality of finlets capable of being attached to the aircraft at predetermined locations.

25. A computerized system of evaluating performance of an aircraft, comprising: a computer having at least one processor;
a non-transient memory storing a plurality of computer instructions;
the processor of the computer, when executing the plurality of computer instructions stored in the non-transient memory, causes the computer to:
receive flight data regarding flights taken by an aircraft over a period of time, the flight data representing data recorded by one or more onboard flight data recorders during said period of time, the flight data including a plurality of data points, each of said data points identifying a plurality of flight parameters and aircraft component operation information at respectively different moments in time of flight by the aircraft, the aircraft component operation information including data regarding settings of control surfaces of the aircraft;
analyze the flight data to identify the data points that include at least one flight parameter that represents a non-cruise condition;
filter the flight data to remove the identified data points to produce a first reduced-size data set that includes only data points that represent a stable cruise condition;
analyze the first reduced-size data to identify the data points that include at least one aircraft component operation information that represents a control surface that is out-of-tolerance;
filter the first reduced-size data set to remove the data points identified as including at least one aircraft component operation information that represents a control surface that is out-of-tolerance to produce a second reduced-size data set;
analyze the first and second reduced-size data sets to ascertain a fuel efficiency that would be gained if the control surfaces of the aircraft that are out-of-tolerance are re-rigged to be in-tolerance;

supply as an output data identifying at least the ascertained fuel efficiency; and identify one or more of the control surfaces of the aircraft for rerigging.

26. The system of claim 25, wherein the received flight data comprises flight data regarding flights taken by the aircraft over a period of at least three months.

27. The system of claim 25, wherein each of the data points in the received flight data includes data identifying at least Mach, pressure altitude, total air temperature, ground speed, latitude, drift angle, angle of attack, pitch angle, and roll angle.

28. The system of claim 25, wherein the received flight data is raw data recorded by said one or more flight data recorders.

29. The system of claim 25, wherein the plurality of data points in the received flight data correspond to data stored approximately every four seconds by the one or more flight data recorders during flight by the aircraft over said period of time.

30. The system of claim 25, wherein the processor causes the computer to generate from the received flight data derived parameters and to add the derived parameters for each of the data points to the flight data, the derived parameters including at least estimates of lift and drag, specific range, and engine health quality.

31. The system of claim 30, wherein the processor causes the computer to analyze the flight data to identify the data points with at least one derived parameter that represents a non-cruise condition.

32. The system of claim 25, wherein the processor causes the computer to analyze the flight data to identify the data points that include a Mach number that is less than 0.40.

33. The system of claim 25, wherein the processor causes the computer to analyze the flight data to identify the data points that include a pressure altitude that is less than 12,000 ft.

34. The system of claim 25, wherein the processor causes the computer to analyze the flight data to identify the data points that represent a non-cruise condition based on parameters relating to speed, altitude and attitude.

35. The system of claim 25, wherein the processor causes the computer to analyze the flight data to identify the data points that, over a minute interval, represent a mean acceleration that exceeds ±1 knot/min or represent altitude variations that exceed ±50 ft/min.

36. The system of claim 25, wherein the processor causes the computer to analyze the flight data to identify the data points that, over a minute interval, represent a mean drift angle that is not in the range of 0±5 degrees or represent a mean roll attitude that is not in the range of 0±2 degrees.

37. The system of claim 25, wherein the processor causes the computer to analyze the flight data to identify the data points that, over a minute interval, represent a Mach variation (Maximum Mach−Minimum Mach) that are not less than 0.005.

38. The system of claim 25, wherein the processor causes the computer to analyze the flight data to identify the data points that, over a minute interval, do not represent a stable cruise condition.

39. The system of claim 25, wherein the processor causes the computer to analyze the first reduced-size data to identify the data points that include aircraft component operation information that indicate that either a left or a right aileron of the aircraft is outside a range of −1 degree to +1 degree.

40. The system of claim 25, wherein the processor causes the computer to analyze the first reduced-size data to identify the data points that include aircraft component operation information that correspond to a mean spoiler deflection that is outside a range of −0.2° to +0.6°.

41. The system of claim 25, wherein the processor causes the computer to analyze the first reduced-size data to identify the data points that include aircraft component operation information that correspond to a rudder deviation that is outside a predetermined acceptable angle.

42. The system of claim 25, wherein the processor causes the computer to: calculate a specific range (SR) of the aircraft based on the data points of the second reduced-size data set;

identify, from the aircraft component operation information of the data points of the first reduced-size data, control surfaces that are out-of-tolerance and identify a respective amount of deviation of each of the identified control surfaces;

calculate a change in specific range (ASR) of the aircraft relative to a like aircraft without out-of-tolerance control surfaces based on the identified control surfaces that are out-of-tolerance and the identified respective amounts of deviation of the identified control surfaces;

supply as an output the calculated ASR.

43. The system of claim 42, wherein the processor causes the computer to access published data regarding fuel usage of the like aircraft without out-of-tolerance control surfaces; and to calculate the ASR based on the published data and the calculated SR of the aircraft.

44. The system of claim 42, wherein the processor causes the computer to conduct computational fluid dynamics simulations to quantify drag reductions that may be realized by re-rigging or fixing of the out-of-tolerance control surfaces.

45. The system of claim 42, wherein the processor causes the computer to supply output data identifying the identified control surfaces that are out-of-tolerance and the identified respective amounts of deviation of the identified control surfaces to enable repair of the control surfaces of the aircraft in accordance with the supplied data.

46. The system of claim 25, wherein the processor causes the computer to:

ascertain a predicted change in drag as a result of a hypothetical retrofitting of the aircraft with a control surface based drag reduction technology;

forecast a change in specific range (ASR) based on the ascertained predicted change in drag and the second reduced-size data set, the ASR representing an improvement in fuel efficiency if the aircraft is retrofitted with the drag reduction technology.

47. The system of claim 46, wherein the drag reduction technology is a plurality of finlets capable of being attached to the aircraft at predetermined locations.

48. A computerized system of evaluating performance of an aircraft, comprising: a computer having at least one processor;

a non-transient memory storing a plurality of computer instructions;

the processor of the computer, when executing the plurality of computer instructions stored in the non-transient memory, causes the computer to:

receive flight data regarding flights taken by an aircraft over a period of time, the flight data representing data recorded by one or more onboard flight data recorders during said period of time, the flight data including a plurality of data points, each of said data points identifying a plurality of flight parameters and aircraft component operation information at respectively different moments in time of flight by the aircraft, the aircraft component operation information including at least data regarding settings of control surfaces of the aircraft;

analyze the flight data to identify the data points that include at least one flight parameter that represents a non-cruise condition;

filter the flight data to remove the identified data points to produce a first reduced-size data set that includes only data points that represent a stable cruise condition;

analyze the first reduced-size data to identify the data points that include at least one aircraft component operation information that represents a control surface that is out-of-tolerance;

filter the first reduced-size data set to remove the data points identified as including at least one aircraft component operation information that represents a control surface that is out-of-tolerance to produce a second reduced-size data set;

analyze the second reduced-size data set to ascertain a fuel efficiency of the aircraft during the stable cruise condition; and supply as an output data identifying at least the ascertained fuel efficiency; and identify one or more of the control surfaces of the aircraft for rerigging.

\* \* \* \* \*